2,999,844
POLYCARBONATE PREPARATION UNDER ANHYDROUS CONDITIONS
Erwin Müller and Otto Bayer, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Oct. 21, 1957, Ser. No. 691,168
Claims priority, application Germany Oct. 22, 1956
7 Claims. (Cl. 260—47)

This invention relates generally to the preparation of carbonates and, more particularly, to a novel and improved method for making polycarbonates suitable for preparing polyurethanes.

It has been proposed heretofore to prepare carbonates by reacting phosgene or a chloroformate with an alcohol. When a mixture of these compounds is heated, a carbonate is formed with hydrogen chloride splitting off. This reaction does not proceed to completion, however, and carbonates containing chlorine are also formed along with the desirable carbonates. The chlorine-containing carbonates can be separated successfully from low molecular weight carbonates, such as by distillation. It is very difficult, if not impossible, however, to separate those carbonates containing chlorine from the desirable carbonates not containing chlorine if the carbonates are polycarbonates of high molecular weight. Polycarbonates of high molecular weight of, say, 1000 or more which contain even small traces of a halogen, such as chlorine, usually are not suitable for making polyurethane plastics, such as, for example, by reaction with an organic polyisocyanate.

It has been suggested that the presence of chlorine-containing carbonates can be avoided by including a compound in the reaction mixture which will react with hydrogen chloride. In other words, it has been proposed to include a compound such as pyridine, dimethylaniline or an alkali alcoholate or phenolate in the reaction mixture. This process is sometimes successful when monomeric carbonates are being prepared but is not suitable for preparing polycarbonates of high molecular weight. The salts of tertiary bases produced by such a process cannot be removed successfully by distillation and are undesirable in the reaction product if it is to be reacted with an organic polyisocyanate or other material. Moreover, an alkali alcoholate or phenolate in the reaction mixture will result in chain breaking and thus prevent the formation of high molecular carbonates.

It is therefore an object of this invention to provide an improved process for making polycarbonates. Another object of the invention is to provide a method for preparing a polycarbonate from phosgene or a compound containing at least two

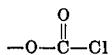

groups and an alcohol. Still another object of the invention is to provide a method for making polycarbonates of high molecular weight of, say, 1000 or more and suitable for preparing polyurethane plastics by reaction with an organic polyisocyanate. A more specific object of the invention is to provide polycarbonates of high molecular weight substantially free from carbonates containing chlorine and suitable for making polyurethanes by reaction with an organic polyisocyanate. Another object of the invention is to provide a method for making polyurethane plastics and to provide novel polyurethane plastics.

Generally speaking, the foregoing objects as well as others are accomplished in accordance with this invention by providing a method for making polycarbonates having a high molecular weight and substantially free from carbonates containing chlorine wherein phosgene or a compound having at least two

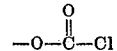

groups is reacted with an organic compound having at least two hydroxyl groups while these two reactants are dissolved in a suitable inert solvent therefor containing either an hydroxide or a carbonate of a metal in the first or second group of the periodic table. This reaction is conducted at a temperature whereby the water produced during the reaction is removed substantially immediately, such as by evaporation or azeotropic distillation.

The invention also contemplates a process for making a polyurethane plastic by reacting the novel polycarbonate of high molecular weight with an organic polyisocyanate. The polycarbonates provided by the invention preferably have a molecular weight of at least 1000 and an hydroxyl number not greater than about 112 and have terminal hydroxyl groups which react with the isocyanato groups of the polyisocyanate to form a urethane linkage. By such a reaction, polyurethanes of higher molecular weight are produced by joining the polycarbonate molecules together through urethane linkages. The polycarbonate having terminal hydroxyl groups can be represented by the general formula

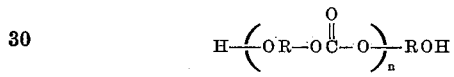

wherein R is a divalent organic radical, either aliphatic or aromatic, $n$ is an integer and the compound has a molecular weight of at least 1000. The reaction product obtained when the polycarbonate is reacted under substantially anhydrous conditions with a polyisocyanate present in an excess over that required to react with all the hydroxyl groups of the polycarbonate may be represented by the formula

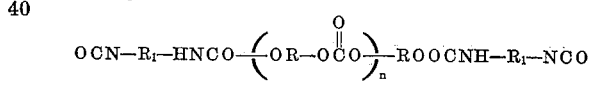

wherein R and $n$ have the same meaning as in the polycarbonate formula and $R_1$ is a divalent organic radical, either aromatic or aliphatic. This product having terminal isocyanato groups may be cross-linked by reaction with any suitable cross-linker, such as, for example, water, a glycol or diamine, as disclosed in U.S. Patents 2,729,618; 2,764,565; 2,778,810; 2,620,516; or 2,621,166. The cross-linked polyurethane plastic may be a cellular polyurethane or a homogeneous substantially non-porous rubber-like material depending upon the cross-linker and conditions of the cross-linking step. Any known manipulative steps may be used, but it is preferred to use the process disclosed in U.S. 2,764,565. The cross-linker may be added at the same time as the polyisocyanate is mixed with the polycarbonate, but it is preferably added after the product having terminal NCO groups has been formed.

Phosgene or any suitable compound containing at least two

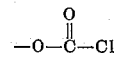

groups may be used to react with the polyhydric alcohol or other compound having alcoholic hydroxyl groups. Examples of such compounds include phosgene acid chloride and a bis-chlorocarbonate, such as, for example, diethylene-bis-chlorocarbonate or other dialkaline-bis-chlorocarbonate, 1,4-butane-di(oxyethyl)-bis-chlorocarbonate, 1,6-hexane-bis-chlorocarbonate and 2-dimethyl-propane-bis-chlorocarbonate.

Any suitable organic hydroxy compound may be used, such as, for example, any primary, secondary or tertiary hydroxyl compound having at least two aliphatic-bound hydroxyl groups. Examples of such compounds include hexane diol, butane diol, 1,4-butane-β-dihydroxyethyl ether, trihydroxy-trimethylolpropane, penta erythritol, a di- or trihydric or polyhydric polyethylene glycol. Moreover, any glycol having an aromatic ring and hydroxyl groups attached to an aliphatic radical, such as, for example, 4,4'-diphenyldimethylmethane-β-dihydroxyethyl ether, 4,4'-diphenylsulfone-β-dihydroxyethyl ether, hydroquinone-β-dihydroxyethyl ether may be used. Compounds having phenolic hydroxyl groups are not as advantageous as compounds having hydroxyl groups attached to aliphatic radicals, but they may be used to advantage in some processes. Examples of such compounds include 4,4'-dihydroxydiphenyldimethylmethane or the sodium salts thereof. Compounds having at least two hydroxyl groups attached to an aliphatic radical are preferred.

Any solvent for the reactants which is inert in the sense that it does not enter into the chemical reaction and which forms an azeotropic mixture with water may be used. Examples of such solvents include toluene and xylene. Any suitable carbonate or hydroxide of any metal falling within the first or second groups of the periodic table may be used, such as, for example, potassium carbonate, potassium hydroxide, sodium hydroxide, sodium carbonate, sodium bicarbonate, potassium bicarbonate and calcium carbonate.

As indicated hereinbefore, the reaction between the phosgene or compound having at least two

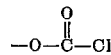

groups and the polyhydroxy compound is conducted at a temperature at which the water formed during the reaction is removed. The hydrocarbon solvent serves as an entraining agent. In mixing the reactants together, one of them may be added while dissolved in the hydrocarbon solvent containing the metal hydride or carbonate and the other reactant may then be added to this solution. Alternately, both reactants may be dissolved in the solvent at the same time and the catalyst may be added either before or after the solution of the reactants has been made. In one embodiment of the invention, the solvent may be mixed with the carbonate or hydroxide of the metal to be used as the catalyst and the reactants may not be added until the solvent has been heated to the boiling point.

It is most advantageous to operate under such conditions that the metal hydroxide or carbonate is suspended in the hydrocarbon. Then, after the suspension has been prepared, the two reactants, that is, the phosgene or compound having at least two

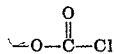

groups and the dihydroxy compound are added slowly to the suspension while it is at the boiling point of the solvent. By following such a process, the water formed during the reaction is azeotropically distilled along with the solvent acting as an entraining agent. As the reaction advances, the hydrocarbon solvent becomes gradually enriched with polycarbonate product solute and the end of the reaction can be determined when no more water is formed. The solution of the polycarbonate in the solvent can be separated from the inorganic salt mixture suspended therein by any suitable means, such as, for example, by filtering or by washing the mixture with water.

It is to be noted that the reaction proceeds with formation of the desired polycarbonate without any saponification reaction which is not predictable. The polycarbonates thus produced are completely halogen free. As pointed out hereinbefore, it is possible to select the reaction conditions and the reactants used to produce a polycarbonate having terminal hydroxyl groups which are useful for reacting with an organic polyisocyanate to produce a polyurethane plastic. These polyurethane plastics are advantageous for the preparation of coatings to be applied to metal, concrete, or the like, or for preparing cellular polyurethane foams useful for insulating purposes, upholstery and the like. The polyurethane plastics prepared from the polycarbonates provided by this invention and an organic polyisocyanate may also be an elastomeric product which can be used as a rubber-like material for making automobile tires, machine parts, bearings or the like.

In order better to describe and further clarify the invention, the following are specific examples thereof:

Example 1

A suitable flask or other container equipped with a stirrer, means for adding the reactants to the flask, such as two dropping funnels, a condenser and a thermometer is charged with about 3.5 liters xylene. About 1.38 kilograms of potassium carbonate are added to the xylene and the resulting suspension is heated to the boiling point of the xylene. About 900 grams 1,4-butane diol are placed in one of the dropping funnels and about 3.03 kilograms of 1,4-butane di(oxyethyl)-bis-chlorocarbonate are placed in the other dropping funnel and are added simultaneously, dropwise, to the boiling liquid. Hydrogen chloride is formed almost immediately and can be observed. Almost simultaneously, water is produced and azeotropically distilled from the reaction mixture. After the mixture has been heated at the boiling point until the reaction is completed, the potassium carbonate-potassium chloride mixture is separated from the solution of polycarbonate by filtration. The solvent is evaporated by heating under a reduced pressure. A viscous yellowish brown oil remains in the reaction vessel which is heated at about 220° C. at a pressure of about 12 millimeters until the low molecular weight constituents have been distilled. The resulting product is a polycarbonate having an hydroxyl number of 89 substantially free from any polycarbonate containing a halogen. The yield is about 3.4 kilograms.

The potassium carbonate-potassium chloride suspended in the reaction mixture may be separated therefrom by washing with water and separating the aqueous layer from the solution of polycarbonate in xylene, if desired. The aqueous layer is, of course, preferably removed before distillation of the low molecular weight constituents.

Example 2

In another embodiment of the invention, a reaction mixture of about 2.1 liters xylene, about 798 grams tri(oxyethyl)-trimethylolpropane and about 474 grams 4,4'-diphenyldimethyl-β-dihydroxyethyl ether, about 1212 grams of 1,4-butane di(oxyethyl)-bis-chlorocarbonate and about 552 grams potassium carbonate are mixed together and reacted in accordance with the process described in Example 1 above. A polycarbonate having terminal hydroxyl groups and also having occasional hydroxyl groups along the chain and an hydroxyl number of 268 is obtained. The yield is about 1.95 kilograms.

Example 3

About 2 liters toluene and about 626 grams potassium carbonate are placed in an apparatus similar to that described in Example 1. The mixture is then heated to the boiling point of toluene which is about 111° C. and about 949 grams diethylene glycol are slowly added, dropwise, to the boiling toluene. Phosgene is bubbled through the toluene simultaneously with the addition of the diethylene glycol. Hydrogen chloride and water are formed and heating is continued until no more water is formed. Throughout the reaction, the temperature of the toluene is maintained at the boiling point and the water is distilled from the reaction mixture as rapidly as it is formed. After no more water is being formed and the reaction has thus gone to completion, the viscous oil is filtered to remove the inorganic salts and then heated to about 220° C. at a pressure of about 12 millimeters until all low molecular weight constituents have been removed. The resulting chlorine-free diethylene polycarbonate has an hydroxyl number of 123.

*Example 4*

About 100 parts by volume of the product of Example 1 are mixed with about 25 parts by volume of 2,4-toluylene diisocyanate and about 6 parts by volume of an activator mixture containing 3 parts by volume adipic acid ester of N-diethylaminoethanol, about 2 parts by volume ammonium oleate and about 1 part by volume water using the injection process described in U.S. Patent 2,764,565. The resulting mixture may be stirred with a suitable agitator, such as that described in the patent. Before any substantial amount of chemical reaction between the water and toluylene diisocyanate, the resulting reaction mixture is poured from the mixing device and the mixture is permitted to chemically react and foam at room temperature.

*Example 5*

The rubber-like polyurethane is prepared from a polycarbonate, such as, for example, that obtained from Example 1 above, by the following procedure:

About 100 parts by volume of the polycarbonate produced in Example 1 are mixed with about 25 parts by volume of 1,5-naphthylene diisocyanate by injecting the diisocyanate into a stream of the polycarbonate as described in U.S. Patent 2,764,565. About 2 parts by volume butylene glycol are injected into each 125 parts by volume of polyester, polycarbonate-diisocyanate mixture at the rate of about 1500 injections per minute. The butylene glycol is the cross-linking agent. After complete mixing of the components, the mixture is cast at a temperature of about 130° C. while confined in molds which were heated to about 100° C. before the reaction mixture was transferred to them. The mixture, while being shaped to the desired configuration in the mold, is maintained at a temperature of about 100° C. for about 24 hours to complete cross-linking.

It is to be understood that any other suitable carbonate or hydroxide of a metal in the first or second group of the periodic table may be substituted for the ones used in the foregoing examples. Likewise, any other suitable organic polyhydric compound can be substituted for the butane diol or other polyhydric compound used in the foregoing examples. Any other suitable compound having at least two

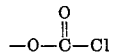

groups may be substituted for the phosgene or compound having such group in the foregoing examples. Any polycarbonate which is substantially free from chlorine and prepared in accordance with this invention may be substituted for those described in Examples 4 and 5 and any suitable process for mixing the components together and for preparing the polyurethane may be substituted for those in these examples. Any of the various organic polyisocyanates or activator mixtures disclosed in the Hoppe et al. Patent 2,764,565 may be used instead of toluylene-2,4-diisocyanate, if desired.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for making a polycarbonate which comprises reacting a compound selected from the group consisting of phosgene and an organic compound having two

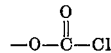

groups with an organic compound having at least two hydroxyl groups selected from the group consisting of a polyhydric alcohol, a phenol and a sodium salt of a phenol while the said reactants are dissolved in an inert organic solvent therefor, said solvent having a member selected from the group consisting of a carbonate, a bicarbonate and an hydroxide of a member selected from the group consisting of an alkali metal and an alkaline earth metal suspended therein, said reaction being conducted under substantially anhydrous conditions at a temperature whereby any water produced by the reaction is removed substantially immediately by azeotropic distillation and a product substantially free from chlorine is obtained.

2. The process of claim 1 wherein the organic compound having at least two hydroxyl groups is a polyhydric alcohol.

3. The process of claim 1 wherein the compound suspended in the said solvent is an alkali metal hydroxide.

4. The process of claim 1 wherein the compound suspended in the said solvent is an alkali metal carbonate.

5. The process of claim 1 wherein the compound suspended in the said solvent is an alkali metal bicarbonate.

6. The process of claim 1 wherein the organic solvent is xylene.

7. The process of claim 1 wherein the organic solvent is toluene.

References Cited in the file of this patent

UNITED STATES PATENTS

| | | |
|---|---|---|
| 2,035,578 | Wagner | Mar. 31, 1936 |
| 2,130,523 | Carothers | Sept. 20, 1938 |
| 2,210,817 | Peterson | Aug. 6, 1940 |
| 2,531,392 | Breslow | Nov. 28, 1950 |
| 2,692,874 | Langerak | Oct. 26, 1954 |
| 2,729,618 | Muller | Jan. 3, 1956 |
| 2,789,972 | Reynolds et al. | Apr. 23, 1957 |

FOREIGN PATENTS

| | | |
|---|---|---|
| 650,002 | Great Britain | Feb. 7, 1951 |
| 546,375 | Belgium | Mar. 23, 1956 |
| 532,543 | Belgium | Oct. 30, 1954 |